United States Patent
Chuang

(10) Patent No.: US 6,538,897 B1
(45) Date of Patent: Mar. 25, 2003

(54) USB REMOVABLE MECHANISM SIZED TO CONFORM TO A FLOPPY DISK DRIVE

(75) Inventor: Yung-Shun Chuang, Hsin-Tien (TW)

(73) Assignee: Aaeon Technology Inc., Taipei (TW)

( * ) Notice: Subject to any disclaimer, the term of this patent is extended or adjusted under 35 U.S.C. 154(b) by 0 days.

(21) Appl. No.: 10/252,535

(22) Filed: Sep. 24, 2002

(51) Int. Cl.[7] .............................................. H05K 5/00
(52) U.S. Cl. ...................... 361/754; 361/798; 439/159
(58) Field of Search ................................. 361/752–754, 361/759, 796–798, 801, 730–732, 790, 747; 439/159, 160

(56) References Cited

U.S. PATENT DOCUMENTS

| | | | | |
|---|---|---|---|---|
| 5,319,524 A | * | 6/1994 | Welch et al. ............... | 361/754 |
| 5,597,316 A | * | 1/1997 | David et al. ................ | 439/159 |
| 6,307,756 B1 | * | 10/2001 | Liu et al. .................... | 361/816 |
| 6,466,434 B1 | * | 10/2002 | Tsai ........................... | 361/685 |

* cited by examiner

Primary Examiner—David Martin
Assistant Examiner—Thanh S. Phan
(74) Attorney, Agent, or Firm—Rabin & Berdo, P.C.

(57) ABSTRACT

A USB removable mechanism is built into a recess in a computer. The recess is sized to conform to a 3.5-inch floppy disk drive. An electronic device for I/O control or analog/digital conversion is detachably mounted in the mechanism. The electronic device comprises two rear USB connectors coupled to and secured to rear USB sockets in the recess for signal communication. A number of advantages are obtained such as easy assembly of one of a variety of electronic devices in the recess, easy replacement of the mounted electronic device, Plug and Play, portable, modular, mountable in an existing 3.5-inch floppy disk drive compartment of the computer without modification.

2 Claims, 3 Drawing Sheets

USB REMOVABLE MECHANISM SIZED TO CONFORM TO A FLOPPY DISK DRIVE

BACKGROUND OF THE INVENTION

1. Field of the Invention

The present invention relates to Universal Serial Bus (USB) and more particularly to a removable mechanism built into a computer for receiving one of a variety of USB electronic devices wherein the removable mechanism is sized to conform to a 3.5-inch floppy disk drive.

2. Description of Related Art

As information and electronic technologies evolve more electronic devices having features of portability and Plug and Play are available for being mounted in personal computers or rugged type computers for industry application. It is also known that modular, portable, and high speed electronic devices complied with the industry specifications are much required in industry applications such as automatic control. For fulfilling the above needs, a number of high speed protocols such as IEEE 1394 and USB are available for external device connections (such as an input/output (I/O) adapters and card readers). However, all of the well known external device connections are implemented by external cables as illustrated in FIG. 3. This implementation has drawbacks of lack of fastening of the coupled external device and being not modular. This often bothers users. Especially, it is unsuitable for industry application. Thus improvement exists.

SUMMARY OF THE INVENTION

It is an object of the present invention to provide a USB removable mechanism built into a recess in a computer, the recess sized to conform to a 3.5-inch floppy disk drive and having a receiving space and two USB sockets in the rear, the removable mechanism comprising an actuator plate in the rear, a link having a rear end coupled to one end of the actuator plate, an eject button in the front coupled to a front end of the link, and an eject plate coupled to the other end of the actuator plate; and an electronic device for I/O control or analog/digital conversion detachably mounted in the removable mechanism, the electronic device comprising a front display panel and two rear USB connectors compatible with a single protocol or a common protocol wherein the USB connectors is coupled to and secured to the USB sockets for signal communication. By utilizing the removable mechanism, a number of advantages are obtained such as easy assembly of a desired one of a variety of electronic devices in the recess, easy replacement of the mounted electronic device, Plug and Play, portable, modular, mountable in an existing 3.5-inch floppy disk drive compartment of computer without modification.

In one aspect of the present invention the electronic device is an adapter card.

The above and other objects, features and advantages of the present invention will become apparent from the following detailed description taken with the accompanying drawings.

DETAILED DESCRIPTION OF THE PREFERRED EMBODIMENTS

Figure 1:
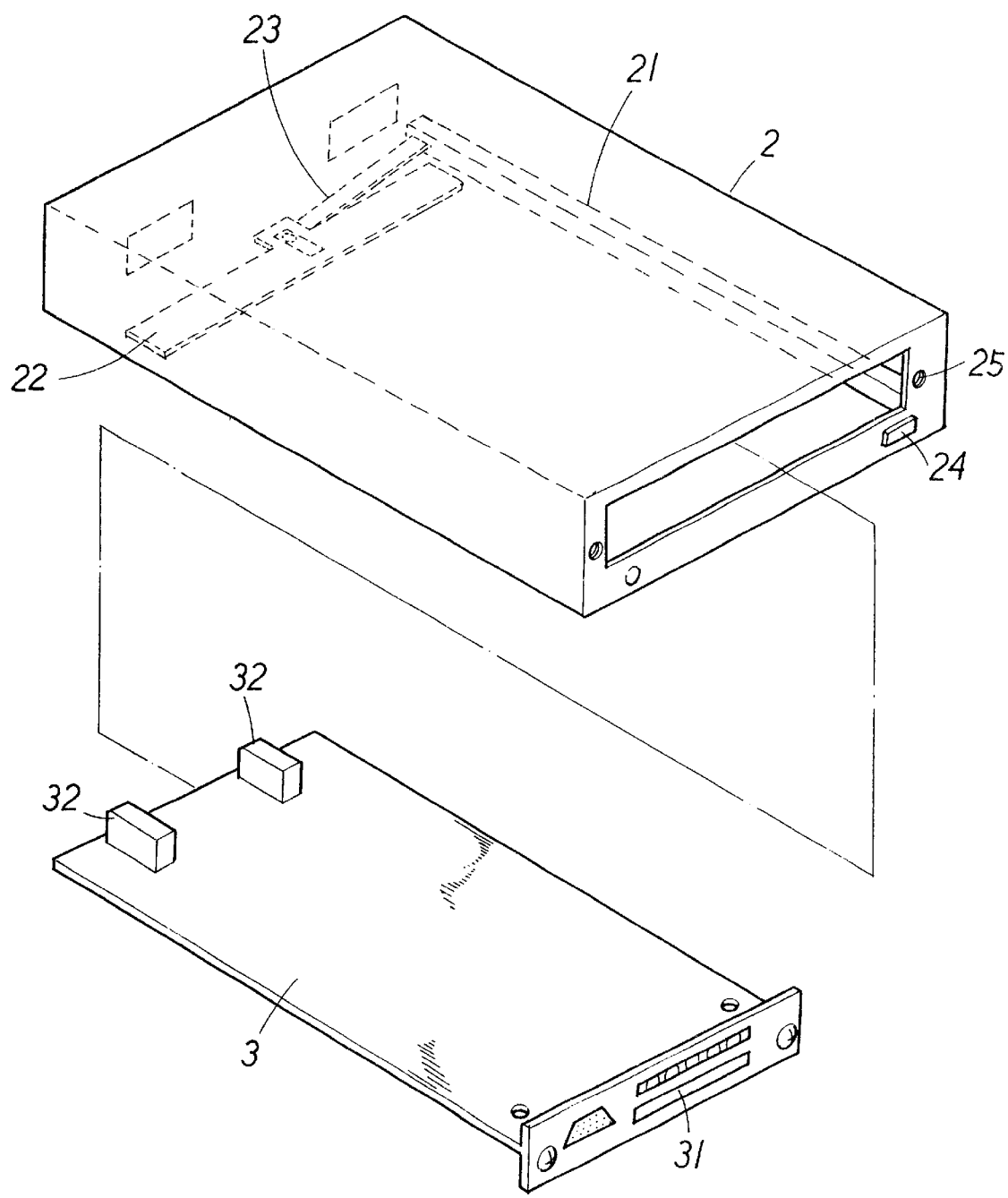
FIG. 1 is an exploded view of a preferred embodiment of USB removable mechanism according to the invention.
Figure 2:
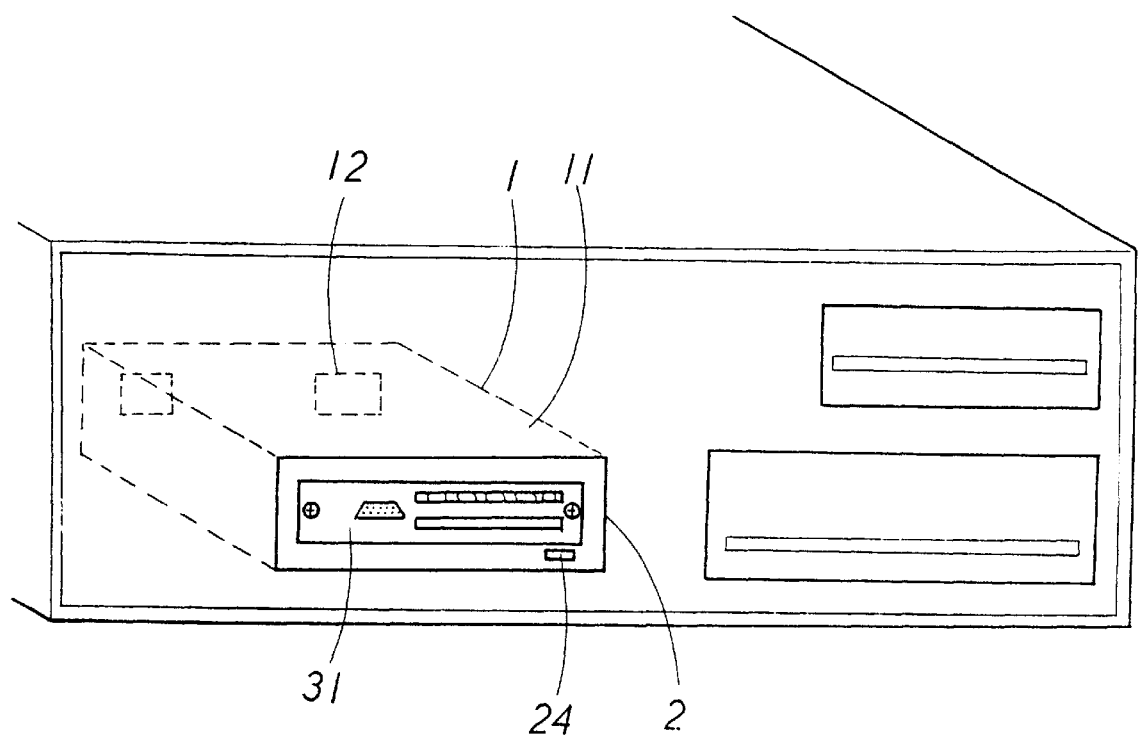
FIG. 2 is a perspective view schematically showing the USB removable mechanism mounted in a computer.
Figure 3:
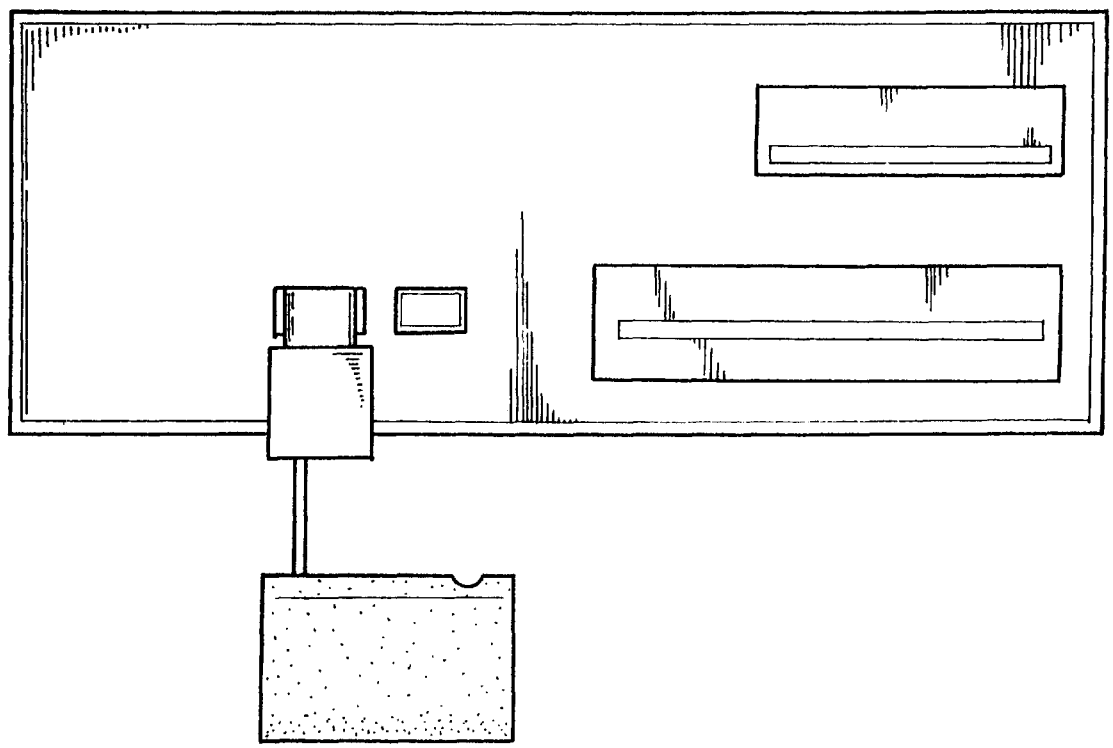
FIG. 3 is a side view of a conventional external device coupled to a computer by an external cable.

Referring to FIGS. 1 and 2, there is shown a USB removable mechanism 2 and an electronic device 3 mounted therein in accordance with the invention. The removable mechanism 2 is shaped to conform to a ⅗" floppy disk drive. A recess 1 is formed in a computer and comprises a receiving space 11 and two USB sockets 12 in the rear. The removable mechanism 2 comprises an actuator plate 23 in the rear, a link 21 having a rear end coupled to one end of the actuator plate 23, an eject button 24 in the front side coupled to a front end of the link 21, two spaced holes 25 in the front adjacent the sides, and an eject plate 22 having a center coupled to the other end of the actuator plate 23. The electronic device 3 is an adapter card 3 in the embodiment. The adapter card 3 is implemented as a circuit board for I/O control or analog/digital conversion. The adapter card 3 comprises a front display panel 31 and two rear USB connectors 32 compatible with a single protocol or a common protocol.

In assembly, first insert the adapter card 3 into the removable mechanism 2 via a front opening of the removable mechanism 2 until the USB connectors 32 are secured in the rear of the removable mechanism 2 and the display panel 31 is positioned in the front thereof. Next, insert the removable mechanism 2 into the receiving space 11. Finally, connect the USB connectors 32 to the USB sockets 12 for signal communication. This completes the assembly. It is envisaged that a user can mount a desired one of a variety of USB electronic devices 3 in the recess 1. This configuration has the benefits of easy assembly, easy replacement of the mounted electronic device 3, Plug and Play, portable, modular, mountable in an existing 3.5-inch floppy disk drive compartment of computer without modification.

While the invention herein disclosed has been described by means of specific embodiments, numerous modifications and variations could be made thereto by those skilled in the art without departing from the scope and spirit of the invention set forth in the claims.

What is claimed is:

1. A USB removable mechanism built into a recess in a computer, the recess sized to conform to a 3.5-inch floppy disk drive and having a receiving space and two USB sockets in the rear, the USB removable mechanism comprising:

an actuator plate in the rear, a link having a rear end coupled to one end of the actuator plate, an eject button in the front coupled to a front end of the link, and an eject plate coupled to the other end of the actuator plate; and an electronic device for I/O control or analog/digital conversion detachably mounted in the USB removable mechanism, the electronic device comprising a front display panel and two rear USB connectors compatible with a single protocol or a common protocol wherein the USB connectors is coupled to and secured to the USB sockets for signal communication.

2. The USB removable mechanism of claim 1, wherein the electronic device is an adapter card.

* * * * *